Feb. 10, 1931.   G. A. JELINEK   1,792,376

TOASTER

Filed Dec. 14, 1927

Inventor:
Gustav Albert Jelinek,
by
His Attorney.

Patented Feb. 10, 1931

1,792,376

UNITED STATES PATENT OFFICE

GUSTAV ALBERT JELINEK, OF CICERO, ILLINOIS, ASSIGNOR TO EDISON ELECTRIC APPLIANCE COMPANY, OF CHICAGO, ILLINOIS, A CORPORATION OF NEW YORK

TOASTER

Application filed December 14, 1927. Serial No. 240,056.

My invention relates to toasters and has for its object the provision of a simple, reliable and efficient means for turning the toast.

More specifically my invention relates to toasters in which provision is made for toasting but one side of the slice at a time, after which the slice is turned to present the opposite side to the source of heat and complete the toasting operation. In some instances the slice is placed in a holder which may be swung away from the source of heat, suitable mechanism being provided whereby when the holder is so swung the slice is turned and when the holder is returned to its starting or toasting position the reverse side of the slice is presented to the source of heat. This arrangement is often used in connection with an electrical source of heat, a slice holder being provided on opposite sides of an electric heating unit which is substantially coextensive with the slice, whereby two slices may be toasted at once.

In one of its aspects my invention relates to simple and efficient means for swinging the slice holders of the general arrangement previously referred to, for the removal or reversal of the slice. In carrying out my invention in one form, I provide an operating member which is connected to the slice holders through suitable mechanism, whereby the holders may be swung with respect to the source of heat.

Figure 1:
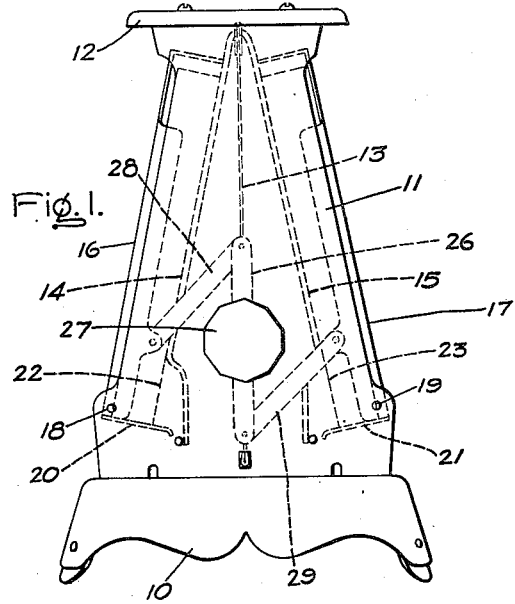
Figure 2:
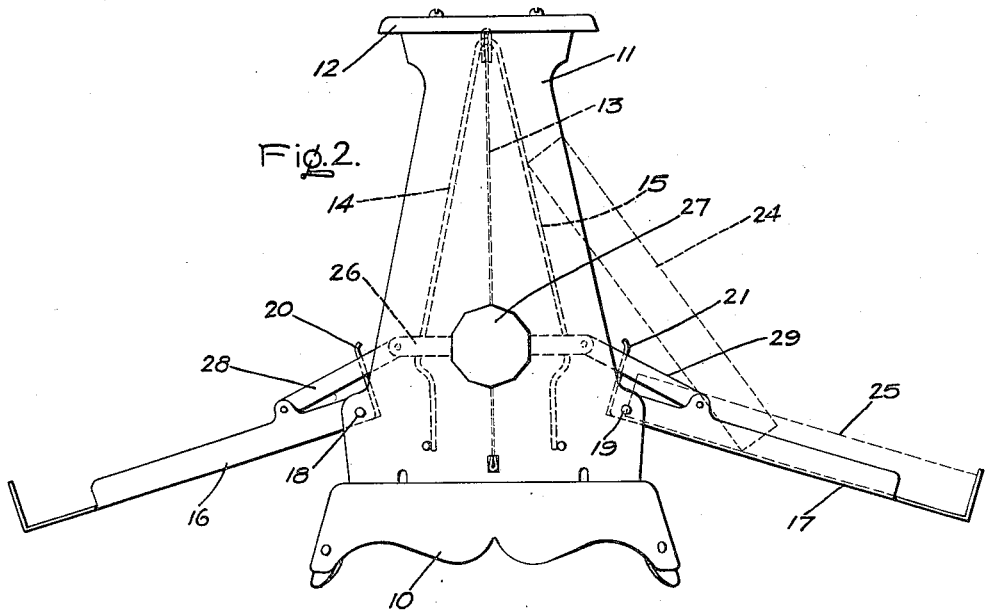

For a more complete understanding of my invention reference should be had to the accompanying drawing in which Fig. 1 is an end elevation view of a toaster embodying my invention with the slice holders in toasting or closed position, while Fig. 2 is a view similar to Fig. 1 but showing the slice holders in open position.

Referring to the drawing, I have shown my invention in one form as applied to an electric toaster, although obviously any suitable source of heat may be used. The toaster comprises a suitable base member 10 provided with an upright support 11 at each end (only one of which is shown) the upper ends of these supports being connected by a top member 12. Mounted in the frame or support formed by the parts 10, 11 and 12 is an electric heating element 13 of suitable form. This heating element is rectangular in shape with relatively small thickness. It extends substantially over the distance between the base 10 and the top 12, as indicated in the drawing, and is also substantially coextensive with the length of the toaster, i. e. the distance between the end supports 11. Any suitable arrangement of heating unit may be used. For example, the unit may consist of a length of resistance heating wire made of nickel-chromium alloy, this wire being secured on a suitable support or supports and passed in spaced lengths or convolutions which are coextensive with the desired heating area. Spaced wire guards 14 and 15 are provided on opposite sides of the heating unit. As shown these guards extend in a vertical direction and they are inclined gradually outward away from the heating unit from the top to the bottom.

On opposite sides of the heating unit are slice holders 16 and 17 which are pivoted, respectively, at their lower ends to the end supports 11, the pivots being indicated by the reference numerals 18 and 19, respectively. Each slice holder consists of a metal frame providing a flat portion against which one side of the slice lies. The upper ends of the holders as viewed in Fig. 1 are turned over toward the heating element to prevent the slice from sliding off when the holders are in their inclined lowered positions, as indicated in Fig. 2.

The lower ends of the slice holders are provided with projections 20 and 21 respectively, extending inward toward the heating element. These projections, however, are provided to facilitate the reversal of the slice when the holders are lowered. With the holders in toasting positions, as shown in Fig. 1, the slices 22 and 23, indicated by dotted lines, rest on the bottom portions 20 and 21 of the holders, and since the pivots 18 and 19 are adjacent the flat surfaces of the holders, it will be observed that when the holders are swung outward and downward away from the heating unit the lower projections 20 and 21 likewise move outward, whereby the lower ends of the slices are pushed outward away from the heating unit. As a result, the slice starts sliding at its two points of contact on the inclined holder and guard, as indicated in dotted lines 24 in Fig. 2, the slice sliding down until it again occupies a position in the holder, as indicated at 25 in Fig. 2. It will be observed however that during this operation the slice was reversed so that when the holders are raised to toasting position the opposite side of the slice is presented to the heating unit.

To facilitate the reversal of the slice a lever arm 26 is pivotally mounted at its center on one of the end supports 11 at a point equidistant from and somewhat above the pivots 18 and 19. As shown this lever arm is positioned on the inside of the support and it is rigidly connected to suitable operating means shown as a knob 27 on the outside of the support, this knob having the same pivot axis as the lever arm. The ends of the lever arm are connected to the holders by means of links 28 and 29 respectively, the links being pivotally secured to the holders at points above the pivots of the holders. By turning the knob 27 therefore the two holders may be simultaneously raised and lowered to effect the reversal or removal of the slice.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States is:

1. A toaster comprising a support, heating means on said support, a pair of slice holders on opposite sides of said heating means, fixed pivots connecting corresponding edges of said slice holders to said support so that said holders can be swung about their fixed pivots either toward or away from said heating means, a common operating lever for said slice holders pivotally mounted on said support at a point substantially equidistant from said fixed pivots, and a pair of link members connecting said common operating lever with each of said slice holders so that both of said holders are swung simultaneously about their fixed pivots by rotative movement of said operating lever about its pivot.

2. A toaster comprising a support, and electric heating unit secured in a vertical position on said support, slice holders on opposite sides of said heating unit, fixed pivots connecting the lower ends of said slice holders to said support so that they may be swung upwardly toward said heating unit to toasting positions on each side thereof, or downwardly away from said heating unit, an operating lever pivotally mounted on said support at a point substantially equidistant from said fixed pivots, a pair of link members connecting said operating lever with each of said slice holders so that both of said holders can be swung about their fixed pivots by rotative movement of said operating lever about its pivot and an actuating knob secured to said operating lever.

3. A toaster comprising a support, an electric heating unit secured in a vertical position on said support, guards for said heating unit on opposite sides thereof, slice holders on opposite sides of said heating unit, fixed pivots connecting the lower ends of said slice holders to said support so that they may be swung upwardly toward said heating unit to toasting positions on each side thereof, or downwardly away from said heating unit, each slice holder being arranged to reverse the slice when the holder is swung away from said heating unit, a common operating lever for said holders pivotally mounted at its center at a point above and substantially equidistant from said fixed pivots, and a pair of link members connecting the opposite ends of said operating lever with said slice holders respectively at points above and substantially equidistant from said fixed pivots so that said holders can be simultaneously raised and simultaneously lowered by rotative movements of said lever, said lever being in a vertical position when said holders are in their toasting positions, and in a horizontal position when said holders have been lowered away from said heating unit.

4. A toaster comprising a support, heating means on said support, slice holders on opposite sides of said heating means, fixed pivots connecting the lower ends of said slice holders to said support so that said slice holders can be moved upwardly and downwardly on said pivots both toward and away from said heating means, a common operating member for said slice holders, means mounting said operating member for rotative movement, and operable connections between said common operating member and said slice holders whereby said slice holders can be moved simultaneously about said pivots either upwardly toward said heating means or downwardly away from said heating means by rotative movements of said common operating member.

5. A toaster comprising a support, an electric heating unit secured in a vertical position on said support, slice holders on opposite sides of said heating unit, fixed pivots connecting the lower ends of said slice holders to said support so that they can be swung upwardly toward said heating unit to toasting positions on each side thereof or downwardly away from said heating unit, a common operating member for said slice holders, means mounting said operating member for rotative movement, operable connections between said common operating member and said slice holders so that said slice holders can be moved simultaneously about said fixed pivots either upward toward said heating unit to their respective toasting positions or downward away from said heating unit by rotative movements of said common operating member, and means for reversing the slices when said holders are moved downward away from said heating unit.

In witness whereof, I have hereunto set my hand this 8th day of December, 1927.

GUSTAV ALBERT JELINEK.